US012747171B2

(12) United States Patent
Nakamura et al.

(10) Patent No.: US 12,747,171 B2
(45) Date of Patent: Sep. 29, 2026

(54) PURE WATER PRODUCTION SYSTEM AND PURE WATER PRODUCTION METHOD

(71) Applicant: ORGANO CORPORATION, Tokyo (JP)

(72) Inventors: Yuki Nakamura, Tokyo (JP); Keisuke Sasaki, Tokyo (JP); Fumio Sudo, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 477 days.

(21) Appl. No.: 18/029,955

(22) PCT Filed: Sep. 2, 2021

(86) PCT No.: PCT/JP2021/032334
§ 371 (c)(1),
(2) Date: Apr. 3, 2023

(87) PCT Pub. No.: WO2022/074975
PCT Pub. Date: Apr. 14, 2022

(65) Prior Publication Data

US 2023/0331593 A1 Oct. 19, 2023

(30) Foreign Application Priority Data

Oct. 5, 2020 (JP) ................................ 2020-168503

(51) Int. Cl.
*C02F 1/44* (2023.01)
*B01D 61/46* (2006.01)
(Continued)

(52) U.S. Cl.
CPC ............ *C02F 1/441* (2013.01); *B01D 61/463* (2022.08); *C02F 1/469* (2013.01);
(Continued)

(58) Field of Classification Search
None
See application file for complete search history.

(56) References Cited

U.S. PATENT DOCUMENTS

| | | | | |
|---|---|---|---|---|
| 6,423,205 | B1 | 7/2002 | Akahori et al. | |
| 2004/0050793 | A1* | 3/2004 | Ando ........................ | C02F 1/64 210/639 |
| 2006/0231491 | A1* | 10/2006 | Mukhopadhyay ........ | C02F 1/42 423/580.1 |

FOREIGN PATENT DOCUMENTS

| | | |
|---|---|---|
| CN | 101121555 A | 2/2008 |
| CN | 104411641 A | 3/2015 |

(Continued)

OTHER PUBLICATIONS

Office Action, dated Jan. 9, 2025, in Taiwanese family member Application No. 110133125, with English language translation thereof.

(Continued)

*Primary Examiner* — Peter Keyworth
(74) *Attorney, Agent, or Firm* — Greenblum & Bernstein, P.L.C.

(57) ABSTRACT

A pure water production system includes a reverse osmosis membrane device; an electric deionized water production device that is disposed downstream of the reverse osmosis membrane device; and a control device that controls a processing condition of the reverse osmosis membrane device. The control device controls a processing condition of the reverse osmosis membrane device such that a removal rate of a specific substance of the electric deionized water production device is equal to or lower than a threshold value, and concentration of the specific substance in the treated water of the electric deionized water production device is equal to or lower than a prescribed value and specific resistance of the treated water of the electric deionized water (Continued)

production device is equal to or higher than a prescribed value.

11 Claims, 7 Drawing Sheets

(51) Int. Cl.
*C02F 1/469* (2023.01)
*C02F 101/10* (2006.01)

(52) U.S. Cl.
CPC .. *C02F 2101/108* (2013.01); *C02F 2209/001* (2013.01); *C02F 2209/06* (2013.01)

(56) References Cited

FOREIGN PATENT DOCUMENTS

| | | | |
|---|---|---|---|
| CN | 105585188 | A | 5/2016 |
| CN | 109399839 | A | 3/2019 |
| JP | 11-244853 | A | 9/1999 |
| JP | 2004-919 | A | 1/2004 |
| JP | 2006-314971 | A | 11/2006 |
| JP | 2018-143922 | A | 9/2018 |
| JP | 2019-188313 | A | 10/2019 |
| TW | 202000599 | A | 1/2020 |
| WO | 99/48820 | A1 | 9/1999 |
| WO | 2017/130454 | A1 | 8/2017 |
| WO | 2020/184045 | A1 | 9/2020 |

OTHER PUBLICATIONS

International Search Report issued Nov. 16, 2021 in International Bureau of WIPO Patent Application No. PCT/JP2021/032334, along with an English translation thereof.
Written Opinion issued Nov. 16, 2021 in International Bureau of WIPO Patent Application No. PCT/JP2021/032334, along with an English translation thereof.
Office Action and Search Report, dated Jun. 11, 2025, that issued in Chinese family member Application No. 202180064366.3, with partial English language translation thereof.

* cited by examiner

[Fig. 1]
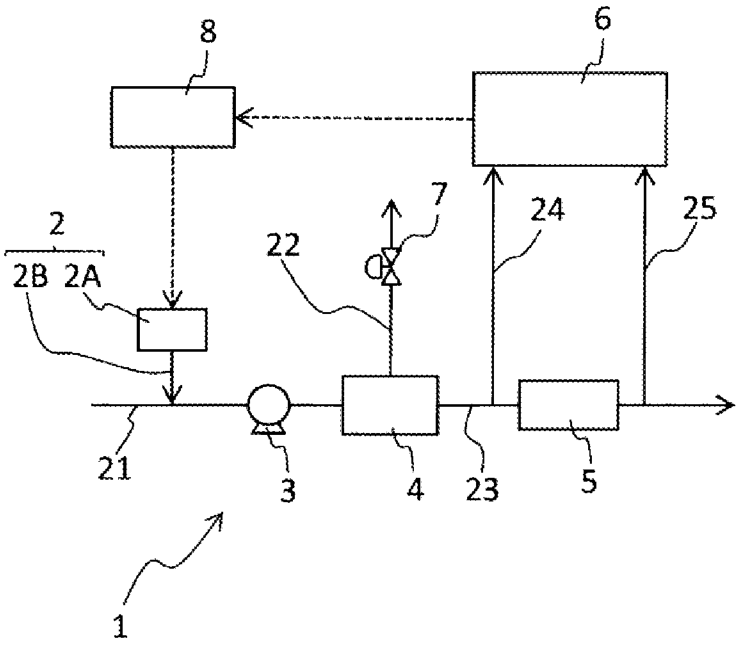

[Fig.2]
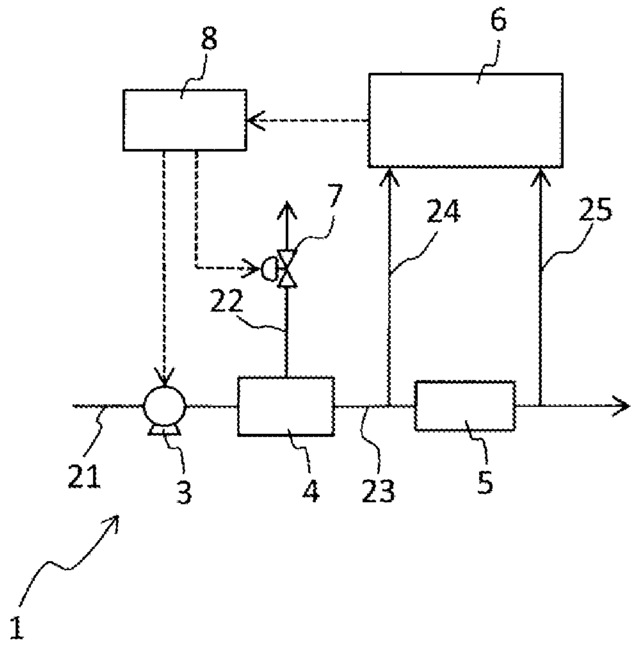

[Fig.3]
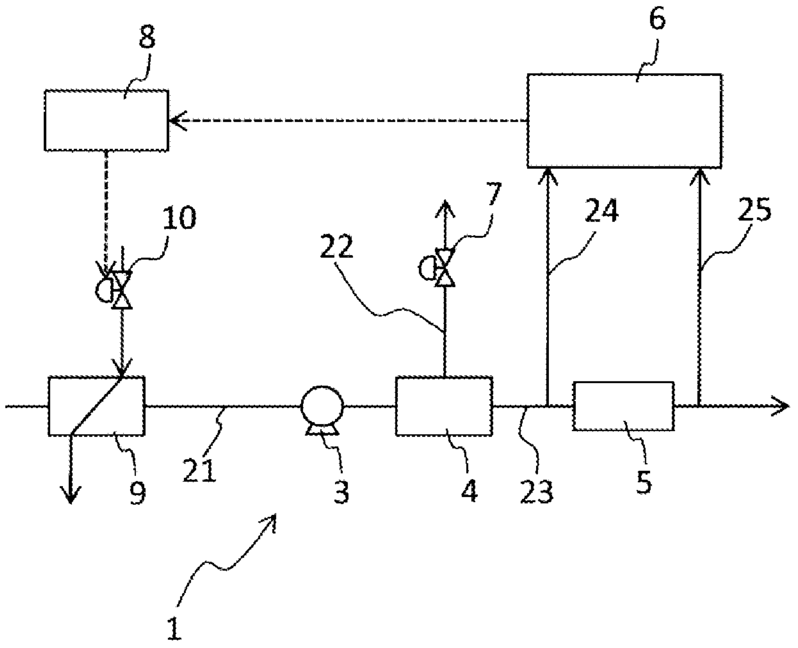

[Fig.4]
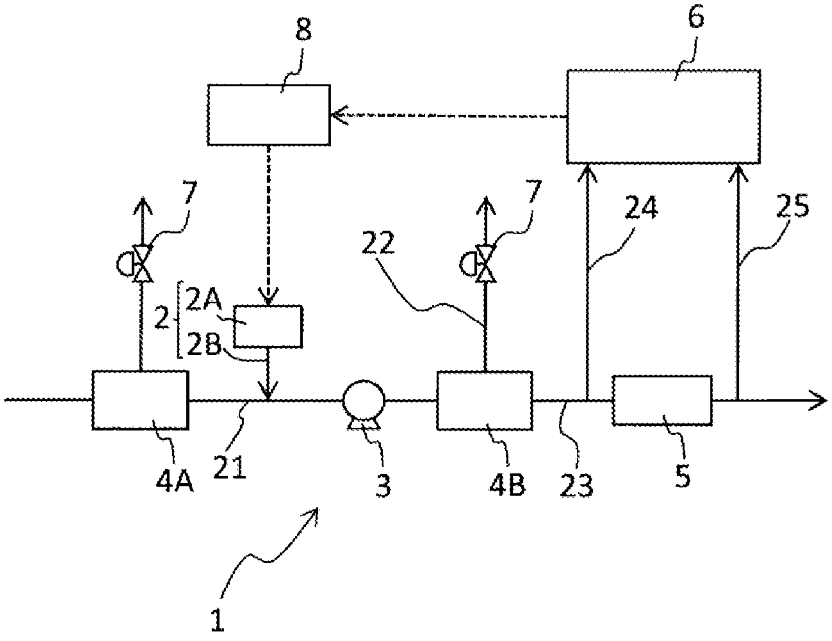

[Fig.5]
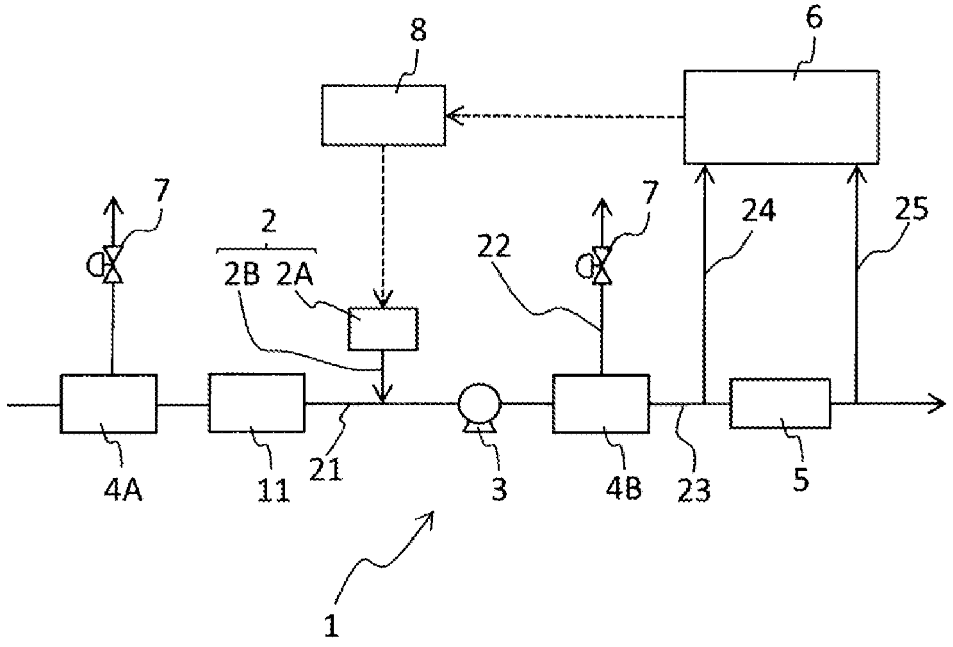

[Fig.6]
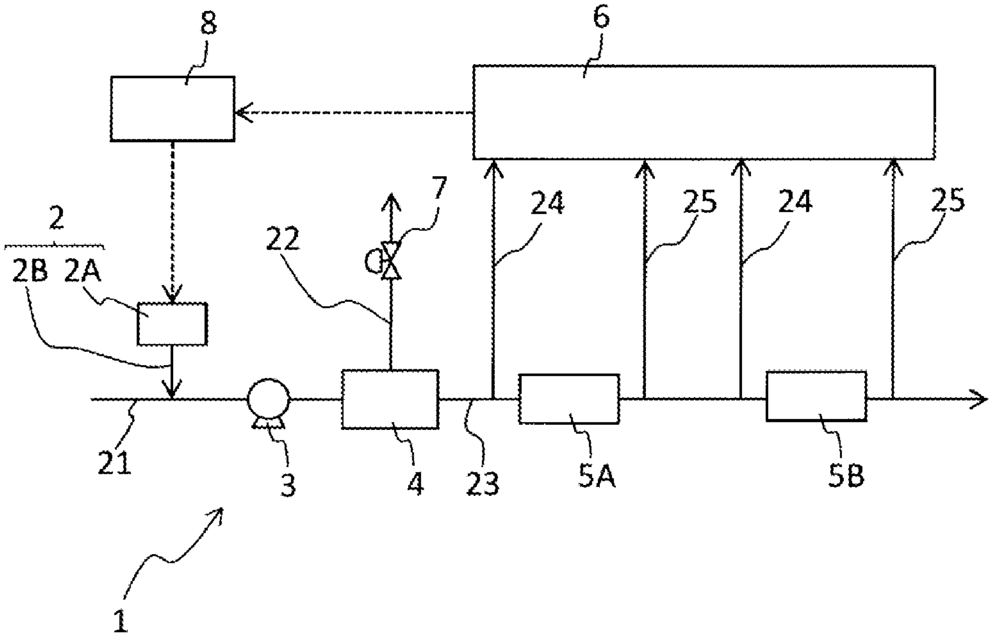

[Fig.7]
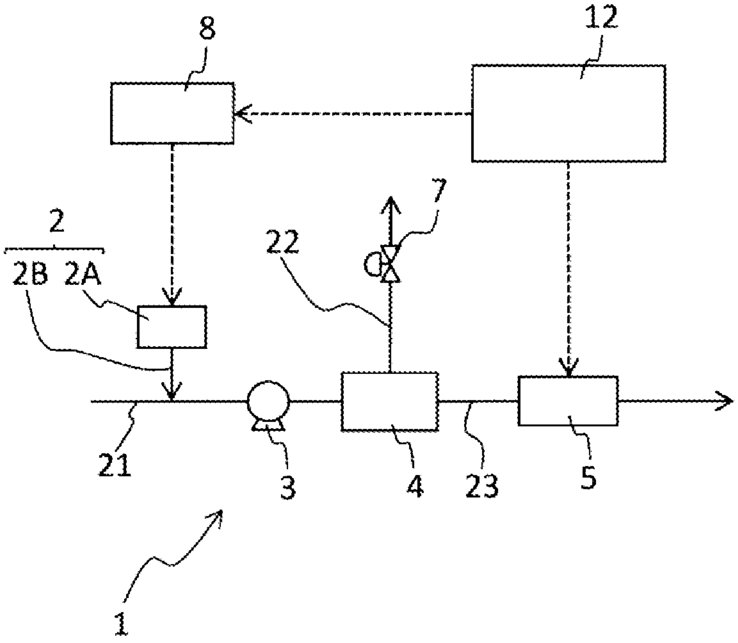

PURE WATER PRODUCTION SYSTEM AND PURE WATER PRODUCTION METHOD

TECHNICAL FIELD

The present invention relates to a pure water production system and a pure water production method.

BACKGROUND ART

Conventionally, ultrapure water has been used for cleaning semiconductors and the like. Due to the improved performance of semiconductors, pure water and ultrapure water of higher purity are required. As described in Patent Document 1, a pure water production system consists of a reverse osmosis membrane device (RO device), an electric deionized water production device (EDI device), and the like.

PRIOR ART DOCUMENTS

Patent Documents

Patent Document 1: JP H11-244853A

SUMMARY OF THE INVENTION

Problem to be Solved by the Invention

While treated water having water quality of high purity is required, cost reduction in ultrapure water production is also required. In order to achieve water quality of high purity in an EDI device, the current applied to the EDI device needs to be increased. However, applying higher current to an EDI device results in higher manufacturing cost.

An object of the present invention is to provide a pure water production system and a pure water production method capable of producing treated water having water quality of high purity and suppressing an increase in production cost.

Means for Solving the Problems

The pure water production system of the present invention comprises a reverse osmosis membrane device, an electric deionized water production device that is disposed downstream of the reverse osmosis membrane device, and a control device that controls a processing condition of the reverse osmosis membrane device, is characterized in that the control device controls a processing condition of the reverse osmosis membrane device such that the removal rate of a specific substance of the electric deionized water production device is equal to or lower than a threshold value, the concentration of the specific substance in the treated water of the electric deionized water production device is equal to or lower than a prescribed value and specific resistance of the treated water of the electric deionized water production device is equal to or higher than a prescribed value.

Effect of the Invention

According to the present invention, it is possible to provide a pure water production system and a pure water production method capable of realizing treated water having water quality of high purity and suppressing an increase in production cost.

BRIEF DESCRIPTION OF THE DRAWINGS

FIG. 1 is a schematic diagram showing the configuration of a pure water production system according to a first embodiment of the present invention.

FIG. 2 is a schematic diagram showing the configuration of a modification of the pure water production system shown in FIG. 1

FIG. 3 is a schematic diagram showing the configuration of another modification of the pure water production system shown in FIG. 1

FIG. 4 is a schematic diagram showing the configuration of a pure water production system according to a second embodiment of the present invention.

FIG. 5 is a schematic diagram showing the configuration of a pure water production system according to a third embodiment of the present invention.

FIG. 6 is a schematic diagram showing the configuration of a pure water production system according to a fourth embodiment of the present invention.

FIG. 7 is a schematic diagram showing the configuration of a pure water production system according to a fifth embodiment of the present invention.

DETAILED DESCRIPTION OF THE EMBODIMENTS

Hereinafter, embodiments of the present invention will be described with reference to the drawings.

First Embodiment

FIG. 1 is a schematic diagram showing the configuration of a pure water production system according to the first embodiment of the present invention. In pure water production system 1 of the present embodiment, pump 3, reverse osmosis membrane device (RO device) 4, and electric deionized water production device (EDI device) 5 are connected with each other in that order along the flow direction of water to be treated. The pressure of the water to be treated, which flows through treated water supply pipe 21, is increased by pump 3, and the water to be treated is then supplied to RO device 4. The water to be treated that is supplied to RO device 4 passes through the reverse osmosis membrane, whereby concentrated water and permeated water are obtained. Concentrated water pipe 22 is connected to a concentration chamber of RO device 4. Permeated water pipe 23 is connected to a permeation chamber. The concentrated water flows through concentrated water pipe 22. The permeated water flows through permeated water pipe 23. Concentrated water pipe 22 is provided with back pressure valve 7. The permeated water of RO device 4 is supplied as water to be treated to EDI device 5 via permeated water pipe 23, and ionic components, boron, and the like in the water to be treated are removed. A chemical liquid injection apparatus 2 is provided upstream of pump 3. Chemical liquid injection apparatus 2 includes a chemical liquid tank, chemical liquid injection pump 2A, and chemical liquid injection pipe 2B. Chemical liquid injection pipe 2B is connected to treated water supply pipe 21 upstream of pump 3. The chemical liquid from the chemical liquid tank passes through chemical liquid injection pipe 2B and is then injected into the water to be treated which flows through treated water supply pipe 21. In addition, pure water production system 1 comprises control device 8 and measuring device 6. Control device 8 controls the processing conditions of RO device 4. Measuring device 6 is connected to sampling lines 24 and 25, which branch from the upstream and downstream pipes of EDI device 5, and measures the impurity concentration of the water which is supplied through sampling lines 24 and 25. In the drawings, a solid line indicates a connecting portion which enables a liquid, a gas, or the like to flow. A broken line indicates a connecting portion which enables electric power or an electric signal to be transmitted without the flow of a liquid, gas, or the like.

The main feature of pure water production system 1 of the present invention is the control operation of control device 8. In the embodiment shown in FIG. 1, measuring device 6 measures the boron concentration of the water to be treated before the water is supplied to EDI device 5 for EDI treatment and also measures the boron concentration of the treated water which is discharged from EDI device 5 after EDI treatment. Measuring device 6 then calculates the boron removal rate of EDI device 5 based on the measured boron concentrations. Upon receiving the boron removal rate of EDI device 5 calculated by measuring device 6, control device 8 controls the processing conditions of RO device 4 based on the input boron removal rate. In the embodiment shown in FIG. 1, control device 8 controls the operation of chemical liquid injection apparatus 2 based on the input boron removal rate to adjust the pH of the water to be treated that is supplied to RO device 4. In this specification, liquid before being supplied to a certain device and processed by the device is referred to as water to be treated. Liquid that has been processed by a device and that is discharged from the device is referred to as treated water. The boron removal rate is obtained by the following equation:

Boron removal rate [%]={1−(boron concentration in treated water)/(boron concentration in water to be treated)}×100.

The technical significance of the present embodiment is next described. The primary object of pure water production system 1 is to decrease the boron concentration of the treated water that is discharged from EDI device 5 after EDI treatment. Generally, when the current applied to EDI device 5 is increased, the boron removal rate of EDI device 5 also increases, and the boron concentration of the treated water after EDI treatment decreases. However, the inventors have found that after the boron removal rate is increased to a certain extent, the boron removal rate shows little increase even if the applied current is further increased, i.e., when the boron removal rate of EDI device 5 reaches a certain threshold value, the boron removal rate is little increased despite further increase of the applied current, and energy efficiency therefore deteriorates. In other words, the effect of removing boron is little improved despite the increase in power consumption and despite the increase in cost due to the increase in the supplied current. Cost performance therefore decreases. Specifically, it has been found that in order to operate EDI device 5 to remove boron with high energy efficiency and high cost performance, EDI device 5 is preferably operated at a boron removal rate that is less than or equal to a threshold value. The threshold value was experimentally found to be 99.7%.

As described above, it was found that high energy efficiency and high cost performance of the EDI treatment can be achieved when the boron removal rate of EDI device 5 is equal to or less than the threshold value (99.7%). However, if the processing conditions of EDI device 5 are adjusted such that the boron removal rate of EDI device 5 is 99.7% or less, the boron concentration of the treated water after EDI treatment may increase to the extent that the boron removal capability of EDI device 5 decreases. This outcome is undesirable because it deviates from the primary object of pure water production system 1. Therefore, it is desirable to operate EDI device 5 at a boron removal rate of 99.7% or less to achieve high energy efficiency and high cost performance while still decreasing the boron concentration of the treated water after the EDI treatment. The boron concentration of the treated water treated by EDI device 5 is preferably 50 ng/L(ppt) or less, and the specific resistance of the treated water is preferably 17 MΩ·cm or more. Therefore, 50 ng/L(ppt) is defined as the prescribed value of the boron concentration, and 17 MΩ·cm is defined as the prescribed value of the specific resistance. From this point of view, in the present invention, rather than controlling the processing conditions of EDI device 5 itself, it is preferable to control the processing conditions, such as at least one of the pH, recovery rate, pressure, and water temperature of the water to be treated by RO device 4 that is positioned upstream of EDI device 5 such that the boron removal rate of EDI device 5 becomes the threshold value (99.7%) or less, the boron concentration of the treated water of EDI device 5 becomes the prescribed value (50 ng/L(ppt)) or less, and the specific resistance of the treated water of EDI device 5 becomes the prescribed value (17 MΩ·cm) or more. In order to maintain the boron removal capability of EDI device 5, the boron removal rate of EDI device 5 is preferably 90% or more. If the boron concentration of the treated water of EDI device 5 becomes higher than 50 ng/L(ppt), the current applied to operate EDI device 5 is increased. However, the current applied to EDI device 5 is increased only to the extent that the power consumption of EDI device 5 does not exceed the threshold value (350 W·h/$m^3$).

In the embodiment shown in FIG. 1, when control device 8 detects that the boron removal rate of EDI device 5 that is calculated by measuring device 6 exceeds 99.7%, the pH of the water to be treated by RO device 4 is adjusted so that the boron removal rate of EDI device 5 may be 99.7% or less, the boron concentration of the treated water of EDI device 5 is 50 ng/L(ppt) or less, and the specific resistance is 17 MΩ·cm or more. Specifically, control device 8 controls the injection amount of the chemical liquid from chemical liquid injection apparatus 2 that is upstream of RO device 4 such that pH adjuster (alkaline agent in the present embodiment) is injected into the water to be treated to increase the pH of the water to be treated that is supplied to RO device 4. As a result, the boron removal capability (boron removal rate) of RO device 4 improves, and when the current applied to EDI device 5 is constant, the boron concentration of the treated water of EDI device 5 will decrease. Accordingly, it becomes possible to decrease the current applied to EDI device 5 and thus lower the boron removal rate of EDI device 5 in accordance with the degree of decrease in the boron concentration of the treated water of EDI device 5 if the current applied to EDI device 5 were kept constant. Control device 8 may adjust the current applied to EDI device 5. In this case, control device 8 may for example calculate the current value based on the difference between the decreased boron concentration of the treated water of the EDI device 5 and the prescribed value of the boron concentration.

By controlling the injection amount of the chemical liquid from chemical liquid injection apparatus 2 so that the boron removal rate of EDI device 5 is maintained at 99.7% or less, EDI device 5 can be operated with favorable energy efficiency and cost performance. Moreover, by controlling the injection amount of the chemical liquid from chemical liquid injection apparatus 2 so that the boron removal rate of EDI device 5 is maintained at, for example, from 99.5% to 99.7%, entire pure water production system 1 including RO device 4 and EDI device 5 can maintain a high boron removal rate. The injection of an excessive amount of pH adjuster results in a decrease of the specific resistance of the EDI treated water and an increase in the water production cost. The pH is therefore preferably adjusted to between 9.2 and 10.0. Although pH adjuster is injected to increase the pH of the water to be treated that is supplied to RO device 4, the other processing conditions (recovery rate, temperature, and pressure) of RO device 4 do not change.

Although not specifically shown, RO device 4 included in the pure water production system of the present invention uses one pressure container (vessel) or a combination of a plurality of pressure containers into each of which one or more RO membrane elements are inserted. There is no limitation on the configuration of the combination of the pressure containers, and both a configuration in which pressure containers are combined in series and a configuration in which pressure containers are combined in parallel may be used. The type of RO membrane element to be used can be selected without limitation depending on the use, the quality of the water to be treated, the required quality of the treated water, the recovery rate, and the like. Specifically, any RO membrane element of a super ultra-low-pressure type, an ultra-low-pressure type, a low-pressure type, an intermediate-pressure type, or a high-pressure type may be used.

EDI device 5 is a device capable of producing deionized water without separately regenerating the ion exchange resin. Specifically, in EDI device 5, a demineralizing chamber is formed by inserting an ion exchanger (anion exchanger and/or cation exchanger) made of ion exchange resin or the like between a cation exchange membrane and an anion exchange membrane. The cation exchange membrane allows only cations (positive ions) to pass through. The anion exchange membrane allows only anions (negative ions) to pass through. Concentration chambers are provided outside of the cation exchange membrane and the anion exchange membrane. The basic structure consists of the demineralizing chamber and two concentration chambers, one concentration chamber being disposed on each of two sides of the demineralizing chamber, and this basic structure is disposed between an anode and a cathode. This EDI device 5 is driven by applying a current across the anode and the cathode and then causing the water to be treated to flow through the demineralizing chamber. However, in the present invention, the specific structure of EDI device 5 is not particularly limited, and any structure may be used.

In the modification of the present embodiment shown in FIG. 2, when control device 8 detects that the boron removal rate of EDI device 5 calculated by measuring device 6 exceeds 99.7%, the recovery rate of RO device 4 is adjusted such that the boron removal rate of EDI device 5 becomes 99.7% or less and such that the boron concentration of the treated water of EDI device 5 becomes 50 ng/L(ppt) or less and specific resistance of the treated water becomes 17 MΩ·cm or more. Specifically, the inverter value of pump 3 and back pressure valve 7 are adjusted to increase the recovery rate of RO device 4. Pump 3 is connected to a portion upstream from RO device 4. Back pressure valve 7 is connected to RO device 4. The recovery rate of RO device 4 is increased by, for example, increasing the inverter value of pump 3 and decreasing the degree of openness of back pressure valve 7, by decreasing the degree of openness of back pressure valve 7 without changing the inverter value of pump 3, or by increasing the inverter value of pump 3 without changing the degree of openness of back pressure valve 7. The recovery rate of RO device 4 is the ratio of the amount of treated water (permeated water) which has passed through RO device 4 to the amount of water to be treated (raw water) which is supplied to RO device 4. Increasing the recovery rate stepwise in any range increases the ion concentration in the treated water (permeated water) of RO device 4, thereby decreasing the boron removal rate of EDI device 5. In addition, when the boron removal rate of EDI device 5 decreases, the boron concentration of the treated water of EDI device 5 becomes larger than 50 ng/L(ppt) or the specific resistance becomes smaller than 17 MΩ·cm, and the recovery rate of RO device 4 conversely decreases. By reducing the ion concentration in the treated water of RO device 4 in this manner, the boron concentration of 50 ng/L(ppt) or less of the treated water and the specific resistance of 17 MΩ·cm or more of the treated water can be maintained with the boron removal rate of EDI device 5 at 99.7% or less.

By adjusting the inverter value of pump 3 and back-pressure valve 7 so that the boron removal rate of EDI device 5 is 99.7% or less, EDI device 5 can be operated with high energy efficient and high cost performance. In addition, controlling the inverter value of pump 3 and back pressure valve 7 such that the boron removal rate of EDI device 5 is, for example, from 99.5% to 99.7%, a high boron removal rate can be maintained for entire pure water production system 1 including RO device 4 and EDI device 5. In pure water production system 1 shown in FIG. 2, chemical liquid injection apparatus 2 as shown in FIG. 1 may not be provided.

In a structure similar to that of the modification of the present embodiment shown in FIG. 2, when control device 8 detects that the boron removal rate of EDI device 5 calculated by measuring device 6 exceeds 99.7%, the pressure applied to RO device 4 can be adjusted so that the boron removal rate of EDI device 5 becomes 99.7% or less, the boron concentration of the treated water of EDI device 5 becomes 50 ng/L(ppt) or less, and the specific resistance becomes 17 MΩ·cm or more. In this embodiment, the inverter value of pump 3 and back pressure valve 7 are adjusted to decrease the pressure applied to RO device 4. Pump 3 is connected to a portion upstream from RO device 4, and back pressure valve 7 is connected to RO device 4. When the pressure applied to RO device 4 is decreased, the ion concentration in the treated water of RO device 4 increases, and the boron removal rate of EDI device 5 therefore decreases. When the boron concentration of the treated water becomes larger than 50 ng/L(ppt) or the specific resistance becomes smaller than 17 MΩ·cm due to the decrease of the boron removal rate of EDI device 5, the pressure applied to RO device 4 is increased so that the ion concentration in the treated water of RO device 4 decreases. The boron concentration of the treated water can thus be maintained at 50 ng/L(ppt) or less and the specific resistance can be maintained at 17 MΩ·cm or more in a situation in which the boron removal rate of EDI device 5 is 99.7% or less.

Adjusting the inverter value of pump 3 and back pressure valve 7 such that the boron removal rate of EDI device 5 is 99.7% or less allows EDI device 5 to be operated with high energy efficiency and high cost performance. In addition, controlling the inverter value of pump 3 and back pressure valve 7 such that the boron removal rate of EDI device 5 is, for example, from 99.5% to 99.7% can maintain a high boron removal rate of pure water production system 1 overall including RO device 4 and EDI device 5.

In the modification of the present embodiment shown in FIG. 3, when control device 8 detects that the boron removal rate of EDI device 5 calculated by measuring device 6 exceeds 99.7%, the water temperature of the water to be treated that is supplied to RO device 4 is adjusted such that the boron removal rate of EDI device 5 becomes 99.7% or less, the boron concentration of the treated water of EDI device 5 becomes 50 ng/L(ppt) or less, and the specific resistance becomes 17 MΩ·cm or more. Specifically, heat exchanger 9 is connected to a portion upstream from pump 3 of pure water production system 1, and valve 10 for regulating the amount of inflow from a heat source or a cooling source is connected to heat exchanger 9. In pure water production system 1, when control device 8 detects that the boron removal rate of EDI device 5 calculated by measuring device 6 exceeds 99.7%, control device 8 adjusts valve 10 connected to heat exchanger 9 that is upstream from RO device 4 to control the amount of inflow from the heat source or the cooling source which flows into heat exchanger 9 in order to raise the water temperature of the water to be treated. As the water temperature of the water to be treated increases, the ion concentration in the treated water of RO device 4 increases, and the boron removal rate of EDI device 5 therefore decreases. In addition, when the boron concentration of the treated water becomes greater than 50 ng/L(ppt) or the specific resistance becomes smaller than 17 MΩ·cm due to decrease of the boron removal rate of EDI device 5, the temperature of the water to be treated is decreased and the ion concentration in the treated water of RO device 4 is therefore lowered. The boron concentration of the treated water can thus be maintained at 50 ng/L(ppt) or less and the specific resistance can be maintained at 17 MΩ·cm or more in a situation in which the boron removal rate of EDI device 5 becomes 99.7% or less.

Adjusting valve 10 connected to heat exchanger 9 such that the boron removal rate of EDI device 5 becomes less than or equal to 99.7% enables operation of EDI device 5 with high energy efficiency and high cost performance. In addition, a high boron removal rate of pure water production system 1 overall including RO device 4 and EDI device 5 can be maintained. In pure water production system 1 shown in FIG. 3, chemical liquid injection apparatus 2 shown in FIG. 1 may not be provided.

Table 1 shows experimental results of specific examples of the present embodiment along with comparative examples shown in FIG. 1.

TABLE 1

| | RO device | | | | | | |
|---|---|---|---|---|---|---|---|
| | Water to be treated (raw water) | | | | | Treated water (permeated water) | |
| | pH | Na concentration (ppb) | Boron concentration (ppb) | Na removal ratio | Boron removal ratio | Na concentration (ppb) | Boron concentration (ppb) |
| Example 1 | 9.2 | 1190 | 20 | 82% | 45% | 210 | 11.1 |
| Example 2 | 9.5 | 1553 | 20 | 81% | 59% | 290 | 8.2 |
| Example 3 | 9.7 | 1978 | 20 | 80% | 68% | 391 | 6.5 |
| Example 4 | 10 | 3125 | 20 | 79% | 77% | 650 | 4.6 |
| Comparative Example 1 | 7 | 828 | 20 | 97% | 28% | 21 | 14.3 |
| Comparative Example 2 | 9.5 | 1553 | 20 | 81% | 59% | 290 | 8.2 |
| Comparative Example 3 | 10.3 | 5415 | 20 | 79% | 81% | 1126 | 3.7 |

| | EDI device | | | | |
|---|---|---|---|---|---|
| | Treated water Boron concentration (ppb) | Boron removal ratio | Specific resistance | Power consumption per Treatment flow rate | Entire system Boron removal ratio |
| Example 1 | 45 | 99.59% | 18 or more | 160 | 99.8% |
| Example 2 | 35 | 99.57% | 18 or more | 155 | 99.8% |
| Example 3 | 25 | 99.61% | 18 or more | 173 | 99.9% |
| Example 4 | 20 | 99.56% | 18 or more | 193 | 99.9% |
| Comparative Example 1 | 35 | 99.76% | 18 or more | 353 | 99.8% |
| Comparative Example 2 | 20 | 99.76% | 18 or more | 394 | 99.9% |
| Comparative Example 3 | | | less than 17 | | |

According to the experimental results of Examples 1 to 4 shown in Table 1, increasing the pH of the water to be treated that is supplied to RO device 4 (where pH=9.2-10.0) such that the boron removal rate of EDI device 5 becomes 99.7% or less can maintain low power consumption of EDI device 5 (where power consumption=155 W·h/m$^3$-193 W·h/m$^3$) and can maintain a high boron removal rate of pure water production system 1 overall (where boron removal rate=99.8%-99.9%). As a result, the boron concentration of the treated water of EDI device 5 can be lowered (where boron concentration=20 ppt-45 ppt). The units of Na concentration and boron concentration of the water to be treated and the treated water of RO device 4 described in the table are μg/L(ppb). The units of the boron concentration of the treated water of EDI device 5 are ng/L(ppt). The power consumption of EDI device 5 is the power consumption per treatment flow rate and is represented by a numerical value (whose units are W·h/m$^3$) calculated based on the following equation.

Power consumption per treatment flow rate of EDI device=(Voltage×Current)/Treatment flow rate According to the experimental results of Comparative Examples 1 and 2 shown in Table 1, when the pH of the water to be treated that is supplied to RO device 4 is set irrespective of the boron removal rate of EDI device 5, the set value of the current of EDI device 5 is increased, and the boron removal rate becomes larger than 99.7% (boron removal rate=99.76%), the power consumption of EDI device 5 increases (power consumption=from 353 W·h/m$^3$-394 W·h/m$^3$). Although the boron removal rate of pure water production system 1 overall is high (boron removal rate=99.8%-99.9%), the power consumption of EDI device 5 is also high, resulting in low energy efficiency and high cost. Further, Comparative Example 3 shows an unfavorable state in which the specific resistance is lowered due to sodium leakage.

The recovery rate of RO device 4 in Examples 1 to 4 and Comparative Examples 1 to 3 shown in Table 1 is 90%, and the boron removal rate of RO device 4 in Examples 1 to 4 is from 45% to 77%. The boron removal rates of RO devices 4 in Comparative Examples 1 to 3 range from 28% to 81%.

Table 2 shows experimental results of specific examples of the present embodiment and comparative examples shown in FIG. 2.

TABLE 2

| | RO device | | | | | | |
|---|---|---|---|---|---|---|---|
| | water to be treated (raw water) | | | | | treated water (permeated water) | |
| | Recovery rate | Na concentration (ppb) | Boron concentration (ppb) | Na removal ratio | Boron removal ratio | Na concentration (ppb) | Boron concentration (ppb) |
| Example 5 | 60% | 1190 | 20 | 89% | 60% | 132 | 8 |
| Example 6 | 70% | 1190 | 20 | 88% | 57% | 147 | 8.7 |
| Example 7 | 80% | 1190 | 20 | 86% | 52% | 169 | 9.6 |
| Example 8 | 90% | 1190 | 20 | 82% | 45% | 210 | 11.1 |
| Comparative Example 4 | 95% | 1190 | 20 | 79% | 38% | 252 | 12.5 |

| | EDI device | | | | |
|---|---|---|---|---|---|
| | Treated water Boron concentration (ppb) | Boron removal ratio | Specific resistance | Power consumption per Treatment flow rate | Entire system Boron removal ratio |
| Example 5 | 30 | 99.63% | 18 or more | 165 | 99.9% |
| Example 6 | 30 | 99.65% | 18 or more | 162 | 99.9% |
| Example 7 | 40 | 99.58% | 18 or more | 183 | 99.8% |
| Example 8 | 45 | 99.59% | 18 or more | 176 | 99.8% |
| Comparative Example 4 | 70 | | | 130 | |

According to the experimental results of Examples 5 to 8 shown in Table 2, increasing the recovery rate of water to be treated which is supplied to RO device 4 (recovery rate=60%-90%) such that the boron removal rate of EDI device 5 becomes 99.7% or less enables maintenance of low power consumption of EDI device 5 (power consumption=162 W·h/m$^3$-183 W·h/m$^3$) and a high boron removal rate of pure water production system 1 overall (boron removal rate=99.8%-99.9%).

In Comparative Example 4 shown in Table 2, the recovery rate of RO device 4 is set irrespective of the boron removal rate of EDI device 5, and the boron concentration in the treated water of EDI device 5 is high (boron concentration=70 ppt) and does not satisfy the standard for adequate quality of the treated water; i.e., the pure water production system of Comparative Example 4 cannot produce pure water having high purity.

In Examples 5 to 8 and Comparative Example 4 shown in Table 2, the pH of water to be treated that is supplied to RO device 4 is 9.2, and the boron removal rate of RO device 4 of Examples 5 to 8 ranges from 45% to 60%. The boron removal rate of RO device 4 of Comparative Example 4 is 38%.

Second Embodiment

FIG. 4 is a schematic diagram showing the configuration of pure water production system 1 according to the second embodiment of the present invention. Pure water production system 1 of the present embodiment includes a plurality of RO devices 4A and 4B. RO devices 4A and 4B are connected to each other in a series, and the treated water of upstream RO device 4A is treated again by downstream RO device 4B. The number of RO devices is not limited to two and may be three or more. Control device 8 of the present embodiment controls the most downstream RO device (RO device 4B in the configuration shown in FIG. 4), controls, for example, the pH of the water to be treated that is supplied to most downstream RO device such that the boron removal rate of EDI device 5 becomes 99.7% or less, the boron concentration of the treated water of EDI device 5 becomes 50 ng/L(ppt) or less, and specific resistance of the treated water becomes 17 MΩ·cm or more, as in the first embodiment. The features of the present embodiment are otherwise the same as in the first embodiment, and redundant description is therefore omitted. In the present embodiment, EDI device 5 may be operated with the boron removal rate at 99.7% or less by controlling the recovery rate, the pressure, or the water temperature of furthest downstream RO device 4B.

Third Embodiment

FIG. 5 is a schematic diagram showing the configuration of pure water production system 1 according to the third embodiment of the present invention. In pure water production system 1 of the present embodiment, deaerator (decarbonator) 11 is provided upstream of the RO device. In this configuration, deaerator 11 removes dissolved gasses, mainly carbon dioxide, in the water to be treated prior to the adjustment of the pH of the water to be treated of RO device such that the boron removal rate of EDI device 5 becomes 99.7% or less, the boron concentration of the treated water of EDI device 5 becomes 50 ng/L(ppt) or less, and the specific resistance becomes 17 MΩ·cm or more, as in the embodiment shown in FIG. 1. In this way, the pH of the water to be treated of the RO device can be adjusted with higher accuracy (for example, the pH is set to 9.2-10.0), and the boron removal rate of the RO device can be accurately controlled. In addition, when, as shown in FIG. 5, a plurality of RO devices are provided as in the second embodiment, the boron removal rate of EDI device 5 should be set to 99.7% or less by arranging deaerator 11 upstream of the most downstream RO device (RO device 4B in the configuration shown in FIG. 5) and adjusting the pH of the water to be treated of the most downstream RO device (RO device 4B in the structure shown in FIG. 5). Since the other features are the same as in the first embodiment, redundant description will be omitted. In the present embodiment, EDI device 5 may be operated at a boron removal rate of 99.7% or less by controlling the recovery rate, the pressure, or the water temperature of furthest downstream RO device 4B.

Fourth Embodiment

FIG. 6 is a schematic diagram showing the configuration of pure water production system 1 according to the fourth embodiment of the present invention. Pure water production system 1 of the present embodiment includes a plurality of EDI device 5A and 5B (two EDI device 5A and 5B in the illustrated example). The plurality of EDI devices 5A and 5B are arranged in a series, and the treated water of upstream EDI device 5A is treated again in downstream EDI device 5B. The number of EDI devices is not limited to two and may be three or more. Control device 8 of the present embodiment controls processing conditions (for example, the pH of the water to be treated) of RO device 4 that is upstream from EDI device 5B such that the boron removal rates of both EDI devices 5A and 5B becomes equal to or lower than the threshold value (99.7%), the boron concentration of the treated water of furthest downstream EDI device 5B becomes 50 ng/L(ppt), and specific resistance of the treated water becomes 17 MΩ·cm. Since the features are otherwise the same as in the first embodiment, redundant description is here omitted. In the present embodiment, EDI devices 5A and 5B may be operated with the boron removal rate at 99.7% or less by controlling the recovery rate, the pressure, or the water temperature of RO device 4. In addition, when a plurality of RO devices 4 are provided and EDI devices 5A and 5B are each preceded by respective RO device 4, the processing conditions of each RO device 4 may be individually controlled such that the boron removal rates of respective EDI device 5A and 5B become 99.7% or less, the boron concentration of the treated water of respective EDI devices 5A and 5B becomes 50 ng/L(ppt) or less, and the respective specific resistances become 17 MΩ·cm or more. In addition, a boron removal resin device (not shown) may be installed downstream from EDI devices 5A and 5B to further reduce the boron concentration of the treated water.

In the first to fourth embodiments described above, measuring device 6 measures the boron concentration of the water to be treated that is supplied to EDI device 5 and the boron concentration of the treated water that is discharged from EDI device 5 to obtain the boron removal rate. However, it is possible to adopt a configuration in which the boron concentration of the water to be treated and the boron concentration of the treated water of EDI device 5 are separately measured and supplied as input to control device 8 following which control device 8 finds the boron removal rate.

In the first to fourth embodiments described above, the processing conditions of RO device 4 are controlled such that EDI device 5 may be operated with the boron removal rate at 99.7% or less, and treated water of high quality can be obtained. EDI-treated water having water quality of high purity can be supplied at low cost by supplying raw water having a boron concentration of from 20 μg/L(ppb) to 200 μg/L(ppb) to RO device 4, and after the water is treated in RO device 4, passing the water through EDI device 5 while implementing control such that the boron concentration becomes 50 ng/L (ppt) or less and the specific resistance becomes 17 MΩ·cm or more. One or more of the pH, recovery rate, pressure, and water temperature of the treated water of RO device 4 can be adjusted to satisfy both the boron removal rate of EDI device 5 and quality of the treated water. In this way, it is possible to efficiently remove boron by EDI treatment and to produce high-quality pure water at low cost. In particular, when the boron removal rate of RO device 4 that is upstream from EDI device 5 is from 40% to 80%, the boron in the treated water of EDI device 5 is sufficiently reduced.

The magnitude of the current supplied to EDI device 5 is not particularly limited as long as the boron removal rate is 99.7% or less. However, if the current value is excessively lowered, the quality of the treated water of EDI device 5 will deteriorate, and the lower limit of the current value is therefore preferably determined so as not to cause deterioration in the quality of the treated water of EDI device 5.

In addition, the pure water production system of the present invention can sufficiently reduce factors relating to water quality other than the boron concentration, such as the specific resistance, hardness, carbonic acid concentration, silica concentration, and the like. For example, the silica concentration in the treated water of RO device 4 can be set to from 0.5 μg/L(ppb) to 20 μg/L(ppb), and the silica concentration in the treated water of EDI device 5 can be set to 50 ng/L(ppt) or less. In this way, the processing conditions of RO device 4 may be controlled based on the removal rate of a specific substance contained in the water to be treated of EDI device 5. The specific substance may be boron as described above, or may be silica or other materials.

Fifth Embodiment

FIG. 7 is a schematic diagram showing the configuration of pure water production system 1 according to the fifth embodiment of the present invention. In pure water production system 1 of the present embodiment, power measurement device 12 is connected to EDI device 5 instead of to measurement device 6 in the configuration shown in FIG. 1. When power measuring device 12 detects that the power consumption of EDI device 5 exceeds 350 W·h/$m^3$, control device 8 controls a processing condition (for example, the pH of the water to be treated) of RO device 4 that is upstream of EDI device 5 and adjusts the power consumption of EDI device 5 to be equal to or lower than a threshold value (for example, 350 W·h/$m^3$) in the same manner as in the aforementioned embodiment shown in FIG. 1 such that the boron concentration of the treated water of EDI device 5 becomes 50 ng/L(ppt) or less and the specific resistance becomes 17 MΩ·cm or more. Since the features are otherwise the same as those of the first embodiment, redundant description is here omitted. In the present embodiment, control device 8 may control the recovery rate, the pressure, or the water temperature of RO device 4 such that the power consumption of EDI device 5 becomes 350 W·h/$m^3$ or less. Also in the present embodiment, it is possible to supply high-purity EDI treated water at a low cost by setting the boron concentration of the treated water that has passed through EDI device 5 to 50 ng/L(ppt) or less and specific resistance of the treated water to 17 MΩ·cm or more. Instead of using power measuring device 12, it is also possible to control the processing condition (for example, the pH of the water to be treated) of RO device 4 that is upstream of EDI device 5 by reading the indicated value of the DC power source connected to EDI device 5 such that the power consumption of the EDI device 5 becomes less than or equal to 350 W·h/$m^3$.

Also, in the configurations shown in FIGS. 2 to 6, although not shown, it is possible to connect power measuring device 12 to EDI device 5 instead of connecting measuring device 6 to EDI device 5 as in the fifth embodiment, or to read the indicated value of a DC power source that is connected to EDI device 5 in order to control processing conditions (such as, for example, the pH of the water to be treated) such that the power consumption of EDI device 5 becomes less than or equal to 350 W·h/$m^3$.

Methods of operating EDI device 5 at a power consumption of 350 W·h/$m^3$ or lower in the present invention also include adjusting the current to be applied to EDI device 5 to an appropriate magnitude while controlling the processing conditions of RO device 4.

When deaerator 11 is provided in the pure water production system of the present invention as in the third embodiment, the position and number of deaerators 11 can be freely set. Deaerator 11 may be installed upstream of RO device 4, and further, additional deaerator 11 may also be installed downstream from RO device 4. One or more deaerators 11 may be installed between RO device 4 and EDI device 5. In addition, one or more deaerators 11 may be installed both upstream from EDI device 5 and downstream from EDI device 5. In addition, although not shown, pure water production system 1 of the present invention may include an ultraviolet oxidation device, a cartridge polisher (CP), a Pd catalyst supporting resin (an ion exchange resin on which a platinum group metal catalyst such as palladium or platinum is supported) and the like. Further, in the configurations shown in FIGS. 1 to 7, additional components may be added or existing components may be omitted as necessary according to the processing conditions (at least one of the pH of the water to be treated, recovery rate, pressure, and temperature of the water to be treated) of RO device 4 that are controlled by control device 8.

Pure water production system 1 described above may be used as an independent system or may be used as a part of an ultrapure water production system. For example, the pure water production system of the present invention can be used as a primary pure water production system located between a pretreatment system of an ultrapure water production system and a secondary pure water production system.

EXPLANATION OF REFERENCE NUMERALS

1 pure water production system
2 chemical injection apparatus
3 pump
4, 4A, 4B reverse osmosis membrane device (RO device)
5, 5A, 5B electric deionized water production device (EDI device)
6 measuring device
7 back pressure valve
8 control device
9 heat exchanger
10 valve
11 deaerator (decarbonator)
12 power measuring device

The invention claimed is:

1. A pure water production system, comprising:

a reverse osmosis membrane device;

an electric deionized water production device that is connected to an upstream pipe and a downstream pipe, wherein the upstream pipe is configured to receive water to be treated from the reverse osmosis membrane device and carry the water to be treated to the electric deionized water production device, and the downstream pipe is configured to receive and carry treated water that is discharged from the electric deionized water production device;

a control device that is configured to control a processing condition of the water to be treated that is upstream of the reverse osmosis membrane device; and a measuring device that is connected to a first sampling line which branches from the upstream pipe and a second sampling line which branches from the downstream pipe, the measuring device being configured to:

measure a boron concentration of the water to be treated of the first sampling line, measure a boron concentration and a specific resistance of the treated water of the second sampling line, and calculate a boron removal rate of the electric deionized water production device based on the measured boron concentrations; wherein based on the calculated boron removal rate that is received from the measuring device, which the control device detects as (i) exceeding a threshold value the calculated boron removal rate, (ii) exceeding a prescribed concentration value of the boron in the treated water of the second sampling line, and/or (iii) exceeding a prescribed specific resistance value of the treated water of the second sampling line, the control device is configured to control at least one of pH, recovery rate, pressure, and temperature of the water to be treated that is upstream of the reverse osmosis membrane device such that:

the calculated boron removal rate becomes equal to or lower than the threshold value, the concentration of the boron in the treated water of the second sampling line becomes equal to or lower than the prescribed concentration value and specific resistance of the treated water of the second sampling line becomes equal to or higher than the prescribed specific resistance value.

2. The pure water production system according to claim 1, wherein the threshold value is 99.7%.

3. The pure water production system according to claim 2, further comprising a heat exchanger connected upstream from the reverse osmosis membrane device, wherein a valve for regulating the amount of inflow from a heat source or a cooling source is connected to heat exchanger, and based on the calculated boron removal rate that is received from the measuring device, which the control device detects as exceeding the threshold value, the control device is configured to adjust the valve connected to heat exchanger to adjust the amount of inflow from the heat source or the cooling source which flows into the heat exchanger in order to adjust the water temperature of the water to be treated such that the calculated boron removal rate becomes equal to or lower than the threshold value.

4. The pure water production system according to claim 2, further comprising a chemical liquid injection apparatus connected upstream from the reverse osmosis membrane device, wherein the chemical liquid injection apparatus is configured to inject a pH adjuster into the water to be treated that is upstream from the reverse osmosis membrane device, and based on the calculated boron removal rate that is received from the measuring device, which the control device detects as exceeding the threshold value, the control device is configured to operate the liquid injection apparatus to inject an effective amount of the pH adjuster to adjust the pH of the water to be treated such that the calculated boron removal rate becomes equal to or lower than the threshold value.

5. The pure water production system according to claim 1, wherein the at least one of pH, recovery rate, pressure, and temperature of water to be treated is controlled such that the concentration of boron in the treated water of the second sampling line is equal to or lower than 50 ng/L and the specific resistance of the treated water of the second sampling line is equal to or higher than 17 MΩ·cm.

6. A pure water production method using a pure water production system according to claim 1, wherein the method comprises:

operating the reverse osmosis membrane device under a processing condition such that such that power consumption of the electric deionized water production device is equal to or lower than 350 $W \cdot h/m^3$, and concentration of boron in the treated water of the electric deionized water production device is equal to or lower than 50 ng/L and specific resistance of the treated water of the electric deionized water production device is equal to or higher than 17 MΩ·cm, and supplying liquid that has passed through the reverse osmosis membrane device to the electric deionized water production device, and operating the electric deionized water production device such that power consumption of the electric deionized water production device is equal to or lower than 350 $W \cdot h/m^3$, and concentration of boron in the treated water of the electric deionized water production device is equal to or lower than 50 ng/L, and specific resistance of the treated water of the electric deionized water production device is equal to or higher than 17 MΩ·cm.

7. A pure water production method using a pure water production system according to claim 1, wherein the method comprises:

operating the reverse osmosis membrane device under a condition of at least one of pH, recovery rate, pressure, and temperature of water to be treated of the reverse osmosis membrane device, that is controlled such that removal rate of a specific substance of the electric deionized water production device is equal to or lower than a threshold value, concentration of the specific substance in the treated water of the electric deionized water production device is equal to or lower than a prescribed value, and specific resistance of the treated water of the electric deionized water production device is equal to or higher than a prescribed value, and supplying liquid that has passed through the reverse osmosis membrane device to the electric deionized water production device, and operating the electric deionized water production device such that removal rate of the specific substance is equal to or lower than the threshold value, the concentration of the specific substance in the treated water of the electric deionized water production device is equal to or lower than a prescribed value, and specific resistance of the treated water of the electric deionized water production device is equal to or higher than the prescribed value.

8. The pure water production method according to claim 7, wherein the removal rate of a specific substance is a boron removal rate.

9. The pure water production method according to claim 8, wherein the threshold value is 99.7%.

10. The pure water production method according to claim 9, wherein at least one of pH, recovery rate, pressure, and temperature of water to be treated of the reverse osmosis membrane device is controlled such that the concentration of boron in the treated water of the electric deionized water production device is equal to or lower than 50 ng/L and specific resistance of the treated water of the electric deionized water production device is equal to or higher than 17 MΩ·cm.

11. The pure water production method according to claim 8, wherein at least one of pH, recovery rate, pressure, and temperature of water to be treated of the reverse osmosis membrane device is controlled such that the concentration of boron in the treated water of the electric deionized water production device is equal to or lower than 50 ng/L and specific resistance of the treated water of the electric deionized water production device is equal to or higher than 17 MΩ·cm.

* * * * *